United States Patent
Cheah

(10) Patent No.: US 7,286,599 B1
(45) Date of Patent: Oct. 23, 2007

(54) METHOD AND DESIGN OF DATA COMMUNICATIONS TRANSCEIVER FOR ULTRA WIDE BAND (UWB) OPERATION IN 3.1 GHZ TO 10.6 GHZ FREQUENCY BAND

(75) Inventor: Jonathon Cheah, San Diego, CA (US)

(73) Assignee: Femto Devices, Inc., San Diego, CA (US)

( * ) Notice: Subject to any disclaimer, the term of this patent is extended or adjusted under 35 U.S.C. 154(b) by 753 days.

(21) Appl. No.: 10/384,292

(22) Filed: Mar. 6, 2003

(51) Int. Cl.
*H03K 7/08* (2006.01)

(52) U.S. Cl. .................................. 375/238; 370/212
(58) Field of Classification Search ............ 375/238, 375/239; 370/212; 332/109, 112, 115
See application file for complete search history.

(56) References Cited

U.S. PATENT DOCUMENTS

| | | | |
|---|---|---|---|
| 4,442,362 A * | 4/1984 | Rao | 307/108 |
| 6,191,724 B1 * | 2/2001 | McEwan | 342/21 |
| 2002/0097790 A1 * | 7/2002 | Dress et al. | 375/219 |
| 2002/0196845 A1 * | 12/2002 | Richards et al. | 375/239 |
| 2003/0063025 A1 * | 4/2003 | Low et al. | 341/157 |
| 2004/0057501 A1 * | 3/2004 | Balachandran et al. | 375/146 |

* cited by examiner

*Primary Examiner*—Kevin Kim
(74) *Attorney, Agent, or Firm*—Blakely, Sokoloff, Taylor & Zafman, LLP

(57) ABSTRACT

An ultra wide band (UWB) communication system includes a channel filter bank to cover the 3.1 to 10.6 GHz band in channels having approximately equal bandwidth. A transmitter and a receiver may share the filter bank when the communication system is configured as a transceiver. The transmitter produces short duration, wide bandwidth RF pulses by triggering the impulse response of one or more of the filters of the filter bank. The impulse response is triggered by applying a very short duration time domain signal produced using a single pulse mixer and a step recovery diode circuit. The receiver uses a square-law detector to detect RF signals passed by the channel filter bank and the detected signals are further processed to extract a data signal and a confidence level in the data signal.

14 Claims, 7 Drawing Sheets

UWB Transmitter 10

METHOD AND DESIGN OF DATA COMMUNICATIONS TRANSCEIVER FOR ULTRA WIDE BAND (UWB) OPERATION IN 3.1 GHZ TO 10.6 GHZ FREQUENCY BAND

FIELD OF THE INVENTION

The present invention relates to a communications system, frequency channel plan, and design of a an Ultra Wide Band (UWB) transceiver that may be implemented in many ways, including but not limited to discrete hardware, integrated circuits, hybrid circuits, waveguides and other forms of microwave circuit elements.

BACKGROUND

In February 2002, the United States Federal Communications Commission (FCC) adopted a First Report and Order ("Order") (FCC 02-48) that permits the marketing and operation of certain types of new products incorporating ultra wide band ("UWB") technology. Specifically, the Order permits the use of 7.5 GHz of frequency spectrum, from 3.1 GHz to 10.6 GHz, for a class of unlicensed devices termed ultra wide band devices. These UWB devices are required to use very short duration electromagnetic wave pulses that result in very large or wideband transmission bandwidths. Those familiar with the communications art recognize that the use of short radio time domain pulses of this nature open up a wide range of potential communication applications. Such transmission schemes also permit wireless communications at a very high speed, on the order of hundreds of megabits per second, and perhaps even gigabits per second.

Under the FCC UWB regulatory definitions there are three types of permitted UWB devices:

1) Imaging Systems—These include Ground Penetrating Radars (GPRs) and imaging devices for through-wall surveillance, and medical purposes. GPRs must be operated below 960 MHz or in the frequency band 3.1-10.6 GHz. GPRs operate only when in contact with, or within close proximity of, the ground for the purpose of detecting or obtaining images of buried objects. The energy from the GPR is intentionally directed down into the ground for this purpose. Wall imaging systems must also be operated below 960 MHz or in the frequency band 3.1-10.6 GHz. Wall imaging systems are designed to detect the location of objects or movement of persons or objects contained within a "wall," such as a concrete structure, the side of a bridge, or the wall of a mine. Surveillance systems operate as "security fences" by providing a stationary RF perimeter to detect the intrusion of persons or objects within that perimeter. The frequency band operation allowed is 1.99-10.6 GHz. Medical imaging systems are used for a variety of health applications to "see" inside the body of a person or animal. These devices must be operated in the frequency band 3.1-10.6 GHz.

2) Vehicular Radar Systems—These systems operate in the 22-29 GHz band using directional antennas on terrestrial transportation vehicles, provided that the center frequency of the emission and the frequency at which the highest radiated emission occurs are greater than 24.075 GHz. These devices are able to detect the location and movement of objects near a vehicle. They can be used for vehicular functions such as near-collision avoidance, improved airbag activation, and suspension systems that better respond to road conditions.

3) Communications and Measurement Systems—Communications and measurement systems are used by a wide variety of applications, such as high-speed home and business networking devices as well as measurement devices. The devices must operate in the frequency band 3.1-10.6 GHz. The equipment must be designed to ensure that operation can only occur indoors or in connection with hand-held devices that may be employed for such activities as peer-to-peer operation.

The FCC Order imposes significantly more stringent unwanted emission limits for UWB devices than those imposed on other existing FCC Part 15 unlicensed band devices. The Order further limits the outdoor use of UWB devices to imaging systems, vehicular radar systems and hand-held devices. The frequency band of operation is based on the −10 dB bandwidth of the UWB emission.

SUMMARY OF THE INVENTION

An embodiment of the invention provides a communication system having a transmitter configured to produce radio frequency (RF) pulses with a pulse duration in at least one channel of a frequency spectrum between 3.1 GHz and 10.6 GHz. The channel is selected by a filter having an equivalent envelope function in both the time domain and the frequency domain (e.g., a Gaussian filter) and may have a bandwidth of 800 MHz. The pulse duration of the RF pulses is preferably, though not necessarily, harmonically related to the channel bandwidth. The filter may be selected from a bank of filters having approximately equal bandwidths within the frequency spectrum.

The transmitter may be implemented as a single pulse mixer coupled to provide an output signal to the Gaussian filter and configured to provide an RF pulse in the presence of a data signal having a data bit rate at a time determined by a pulse clock. The pulse clock is provided as an input to a step recovery diode circuit, the output of which is provided as an input to the single pulse mixer. The pulse clock preferably has a period which is modulo(data bit rate), the channel bandwidth is preferably modulo(data bit rate) and the transmitter may have a high speed mode in which a high speed mode transmission rate is odd modulo(data bit rate).

In one embodiment, the communication system also includes a receiver configured to receive RF transmissions in the frequency spectrum between 3.1 GHz and 10.6 GHz, according to a selected filter channel. The receiver may share the Gaussian filter with the transmitter and is configured to provide a data output along with a confidence level output indicative of a likelihood of error in the data output. The data output and the confidence level output may be provided through a pair of comparators which operate to measure received RF transmissions against established signal amplitude levels for logic 1s logic 0s in a received pulse train. A pair of sample and hold circuits are configured to store the established signal amplitude levels.

In a further embodiment of the present invention, an ultra wide band transmission is produced using an impulse response of a filter (e.g., a Gaussian filter), the impulse response being generated by applying a very short duration time domain signal as an input to the filter, wherein a pulse width of the very short duration time domain signal is determined by a minority carrier lifetime and transition time of a step recovery diode circuit. The very short duration time domain signal may be harmonically related to the bandwidth of the filter.

A further embodiment provides for receiving an ultra wide band RF signal via a channel filter and determining whether or not a pulse is present in the RF signal by comparing a received amplitude of the signal to a stored value representing an expected amplitude of a received pulse. The process may further include providing a decision as to whether or not the pulse is present in the RF signal along with a value representing a confidence level in the decision.

Yet another embodiment provides a receiver having a channel filter bank configured to permit selection of one or more channel filters through which a received RF signal may be passed, a detector coupled to receive the output of the channel filter bank and a signal decision block configured to receive an output of the detector and to provide a data signal, wherein the channel filter bank covers a frequency spectrum between 3.1 GHz and 10.6 GHz, and each filter of the channel filter bank has an equivalent envelope function in both the time domain and the frequency domain. Each filter of the channel filter bank may be a Gaussian filter.

The signal decision block may be configured to provide the data signal along with a confidence level output indicative of a likelihood of error in the data signal. The data signal and the confidence level output may be provided through a pair of comparators which operate to measure received RF transmissions against established signal amplitude levels for logic 1s and logic 0s in a received pulse train and a pair of sample and hold circuits may be configured to store the established signal amplitude levels.

BRIEF DESCRIPTION OF THE DRAWINGS

The present invention is described by way of example, and not limitation in the figures of the accompanying drawings in which.

DETAILED DESCRIPTION

Figure 1:
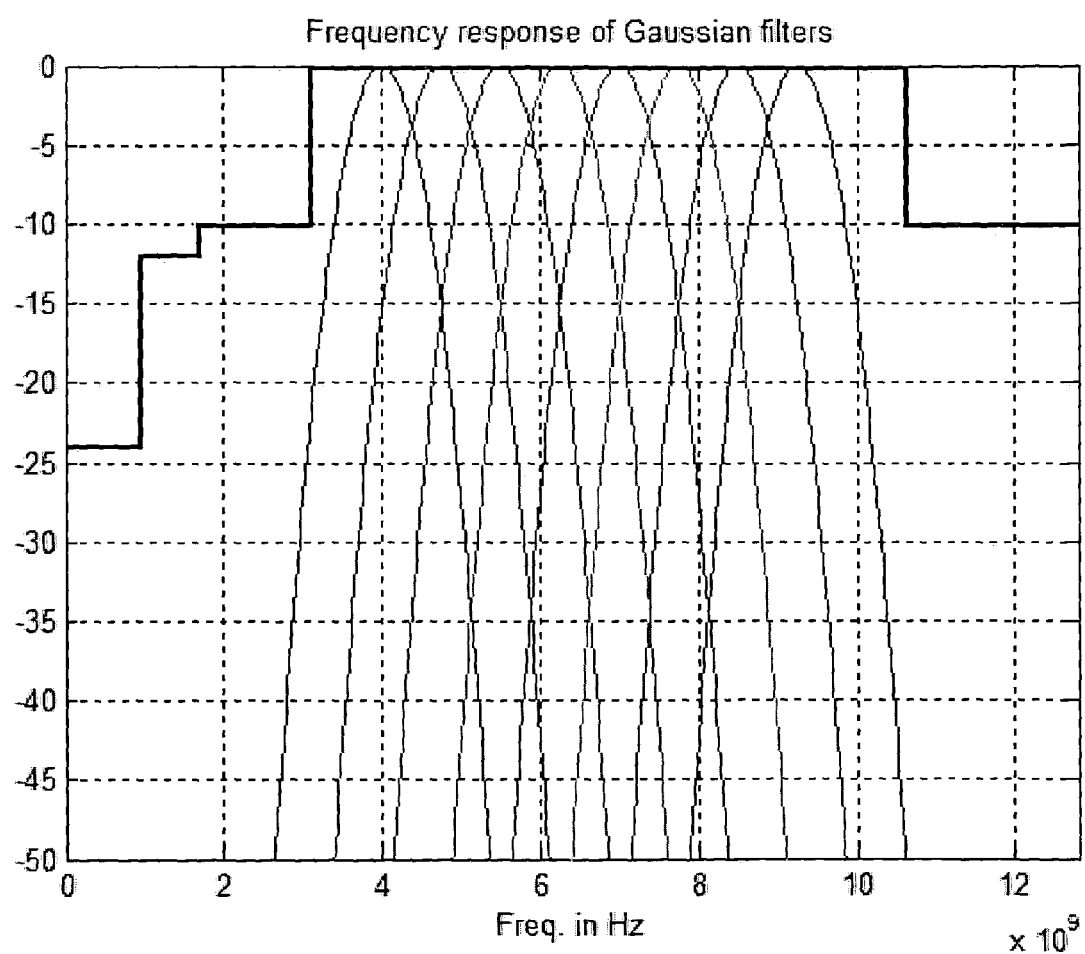
FIG. 1 shows a frequency channel plan for a bank of Gaussian filters to be employed in UWB devices in accordance with an embodiment of the present invention.

Described herein is a communication system that can be utilized in the UWB band as permitted by the FCC. In various embodiments, the system may be configured as a UWB transmitter, a UWB receiver and/or a UWB transceiver. As will be apparent to those of ordinary skill in the art after reviewing this disclosure, the present invention provides all the necessary methods and designs in order to meet the regulatory requirements for a complete UWB system. In particular, the present invention sets forth a system of frequency channels so as to maximize the total frequency spectrum utilization. A short time domain pulse generation method is described so that the generation of the short radio wave pulses required for UWB transmissions can be wave shaped in the time domain, or, in other words, filtered in the frequency domain, in a manner that simplifies the implementation expense. Of course, a complementary scheme for the reception of the transmitted radio wave pulses is also described.

A further embodiment of this invention provides a complete description of methods and designs of a UWB transmitter and receiver and the air interface systems. It will be clear to one of ordinary skill in the art that the use of such methods and designs is not limited solely to digital data communications, but that they can be applied to all the categories of applications permitted by the FCC regulations on UWB systems.

Yet another embodiment of the present invention provides a system of frequency channels with bandwidth greater than 500 MHz per channel within the 3.1 to 10.6 GHz frequency range as required by the FCC Order. Within each frequency channel, a Gaussian filter is used to wave shape, in the time domain, the short radio pulses. Because a Gaussian filter has the same envelope function in the time domain as in the frequency domain, a rather straightforward implementation for achieving the desirable wave shaping at the very high frequencies needed in the 3.1 to 10.6 GHz band is provided. Of course, the present invention is not limited to the use of Gaussian filters. Instead, any class of filters that provide a suitable time domain impulse response can be used. Filters such as the Gaussian filter may be implemented using common integrated circuit (IC) processes, such as GaAs, RFCMOS, SiGe or Hybrid Microwave IC (MIC) processes at high frequencies of 3.1 to 10.6 GHz, and with bandwidths greater than 500 MHz. Such filters may also be implemented in discrete components, such as transistors, diodes and distributed transmission components such as strip-lines, microstrips, coaxial cables and waveguides.

If the relationship of the short radio pulse time period is harmonically related to the channel bandwidth, then there is an added advantage that can be exploited. Short RF time domain pulses can be efficiently generated by using frequency multiplication means. A very short RF impulse is generated and this impulse energy is provided to the Gaussian filter. The resultant output energy from the Gaussian filter will have an amplitude and phase envelope in the time domain according to the impulse response of the Gaussian filter. In essence, this method provides a direct means of performing Gaussian wave shaping in the time domain at 3.1 to 10.6 GHz. Thus, the present invention achieves an advantage over current state of the art digital signal processing methods of producing time domain wave shaping, inasmuch as currently available digital signal processors do not have the necessary processor speed to produce shaped RF time domain pulse at 3.1 to 10.6 GHz.

In still another embodiment of the present invention, the transmit/receive channel is selected by selection of a Gaussian filter frequency for the channel. That is, there exists a Gaussian filter bank corresponding to the various available channels. This filter channel bank can be designed as a series of independent filters, which can be selected by the user independently, or as a single filter selectable by switching the resonating elements thereof.

During transmission, the short RF time domain pulse is generated in accordance with the pulse position modulation of the base band data stream. Each short RF time domain pulse is generated for each base band data bit. Although it is not a requirement for the effective operation of this invention, the base band data bit stream can be an integer sub-harmonic frequency of the filter bandwidth. In this way, there will be minimum bit timing jitter introduced. Therefore the present invention is not limited to base band data bit rates that are harmonically related to the channel bandwidth.

The base band digital data can also be coded for forward error correction in convolution or block code or both. The data bits may also be frequency spread by chip-sequence. In this case a unique sequence of pulses is used as logical "1s" or "0s" by determining the autocorrelation function of the chipping sequence. The base band data can also be further processed such that pulse position modulation, and amplitude shift keying (ASK) means of transmission well known in the communications art can be used.

The data information is transmitted in a packetized format. At beginning of a transmission, a sequence of RF pulses is transmitted in manner that is suitable for preamble detection. The sequence can be selected from a number of well-known mathematical formulations, such as a Barker sequence. It can also be a train of uninterrupted pulses for use in training the receiver equalizers, and/or other necessary modem synchronizations. The information following the preamble pulse train should be transmitted in accordance with the respective media access control (MAC) data packet specifications.

In still a further embodiment of the invention, during reception the RF time domain pulses are passed through a Gaussian filter bank in the receiver's front end. Only the selection of the correct filter corresponding to the transmitter's frequency channel filter will allow the reception of the transmitted RF pulse.

The received RF energy is then detected using a RF detector diode. The detected signal is processed by comparing the maximum and minimum pulse energy with respect to that found in the presence of a valid RF pulse. The periodicity of the pulse train is used in the synchronization of a bit timing block. The amplitude of the received RF pulse is further processed into soft-decision bit information to qualify the value of the received bit in terms of a confidence level in the decision. As is well known in the art, such soft decisions can be used in forward error correction coding processes.

Thus, various embodiments of this invention provides a complete physical layer for the transmission and/or reception of data for the category of devices permitted to operate within the UWB regulatory constraints and requirements.

As indicated above, in various embodiments of the present invention, the entire 3.1 GHz to 10.6 GHz band is channelized into a number, for example eight (8), of suitably placed channels, each with approximately equal (e.g., 800 MHz) bandwidth. The choice of the channel bandwidth can facilitate a straightforward implementation of the transmitter and the receiver architecture; however, other bandwidth choices should not affect the feasibility of operation of this invention.

The example of 800 MHz channel bandwidth is used herein so that an exemplary system having a basic 200 Mbps data bit rate can be described. Because 800 is an integer multiple of 200, this bandwidth choice allows the generation of the pulse clock to be conveniently aligned with the bit clock. In this way, the short RF pulse generated during transmission can be placed in the precise time location without any timing jitter. Furthermore, it is possible to allow faster systems to consume two adjacent channels so that a 3×800 Mhz=2.4 GHz bandwidth wide signal can be made possible. In this case, a basic 3×200 Mbps or 600 Mbps base band data rate can be achieved.

Similarly, the bit rate can also be reduced by increasing the inter-pulse time spacing. The FCC UWB Order requires that the peak power be less than $$20+20*\log(\text{Bandwidth}/50 \text{ Mhz})$$

above the average power or less than 60 dB, whichever is smaller. Reducing the bit rate and the data packet transmission rate can be used to increase desirable transmission range by allocating maximum peak power to each pulse with fewer pulses transmitted. Therefore this invention allows a simple trade-off among transmission range, power used and the data rate within the scope of the implementation.

The significance of the ability to provide greater than 480 Mbps has its commercial implications for the present invention. 480 Mbps is the fastest data bit rate of the universal serial bus (USB) protocol, which is now very popular for wired computer data communications with portable devices such as external disk drives, keyboards and mice, network cards, flash memory devices and others. By providing an alternative communication scheme capable of data rates in excess of 480 Mbps, the present invention offers a compelling wireless alternative to wired USB technology.

In the FCC UWB Order, the use of short, time domain pulses is required and it is desirable to limit the time domain pulses' ability to ring in time so as to prevent inter-pulse interference. It is clear that any ringing of the short pulses, caused by the impulse response of the channel, will deleteriously reduce the speed of the pulse train. In the communications art, it is well know that a Square-Root Raised Cosine Filter will provide no interfering ringing effect (also called inter-pulse interference) and superior spectrum efficiency if it is sampled correctly. However, such a filter has a very complex impulse response and is very difficult to reproduce; particularly at very high frequencies such as 800 MHz, which is orders of magnitude faster than any available digital signal processing processors can currently operate. In UWB, spectrum efficiency is not the main consideration, rather, the key focus is on the emitted power density. Thus, such applications require another class of filter.

The characteristics of the selected filter should be such that the filter's frequency domain performance is the same or similar to its time domain response. In this way, wave shaping can be carried out easily without the need of any special digital signal processing requirements. It is also known that the Fourier transform of the Gaussian exponential function remains an exponential function.

The Gaussian time impulse can be written as:

$$h(t) = e^{-0.5\left(\frac{t}{\tau}\right)^2}$$

Where, $\tau$ is a constant value that represents the inverse of half of the desirable bandwidth. The Gaussian time impulse response is very well behaved and it exhibits no ringing or over shoot effects.

The Gaussian frequency response, which is also a Gaussian exponential function, can be written as:

$$H(\omega) = \tau \cdot \sqrt{2\pi} \cdot e^{-0.5(\tau\omega)^2}$$

The Gaussian frequency response has a very gradual fall off in frequency and, therefore, it is especially suitable for devices which must comply with the FCC UWB Order. The phase of the Gaussian filter is linear, and, as a result, it is possible to approximate the frequency response very accurately using lumped element LC components fabricated in IC processes.

Based on these considerations, the channel filter bank for one embodiment of the present invention is constructed as shown in FIG. 1. In this illustration, which shows a Gaussian filter channel plan for UWB channels as well as a spectrum mask, 0 dB corresponds to −41.3 dBm as set forth in the FCC Order. The eight frequency channels are arranged with Channel 1 having a center frequency of 4.000 GHz and each channel having 800 MHz of bandwidth to cover the UWB spectrum as permitted by the FCC Order. Thus, the frequency plan is:

Channel 1: 4.000 GHz
Channel 2: 4.800 GHz
Channel 3: 5.600 GHz
Channel 4: 6.400 GHz
Channel 5: 7.200 GHz
Channel 6: 8.000 GHz
Channel 7: 8.800 GHz
Channel 8: 9.600 GHz Of course, the frequency plan is not limited to the numerical example shown in the illustration, and can also be a harmonic relationship of the base band pulse frequency. In the present example, the base band pulse frequency is 800 MHz.

Six of the inner channels, Channels 2-7, can also be expanded into three, high-speed channels with 2.4 GHz bandwidth per channel. The reason to expand into both adjacent lower and upper channels is so that there exists an operation whereby the data speed can be increased without loosing the connection. For example, devices operating in Channel 2, when the propagation conditions are favorable, may negotiate with one another to expand their existing connection into a high-speed mode by selecting a wider filter which covers Channels 1, 2 and 3 and thereby occupy 2.4 GHz of bandwidth. The expansion operation does not limit the ability to further extend to five consecutive channels so that the cumulative bandwidth is 4 GHz in Channels 3-6 or 5.6 GHz in Channels 4 and 5.

The optimum relationship among the channel plan, filter bandwidth, pulse clock rate, the basic data bit rate and the high speed mode bit rate should be bounded by the following conditions:

Pulse Clock rate=modulo(Basic bit rate)

Channel Plan=modulo(Pulse Clock rate)

Channel bandwidth=modulo(Basic bit rate)

High speed mode rate=odd modulo(Basic bit rate)

In this way, it can be shown that for the basic data bit rate of 200 Mbps, a high-speed mode data transmission rate of 600 Mbps is possible using the present UWB scheme in Channels 2-7. Furthermore, a 1.0 Gbps data transmission rate (in Channels 3-6) and/or 1.6 Gbps data transmission rate (in Channels 4-5) is/are also possible. Indeed, any numerical solution appropriate to this implementation should also be feasible.

Figure 2:
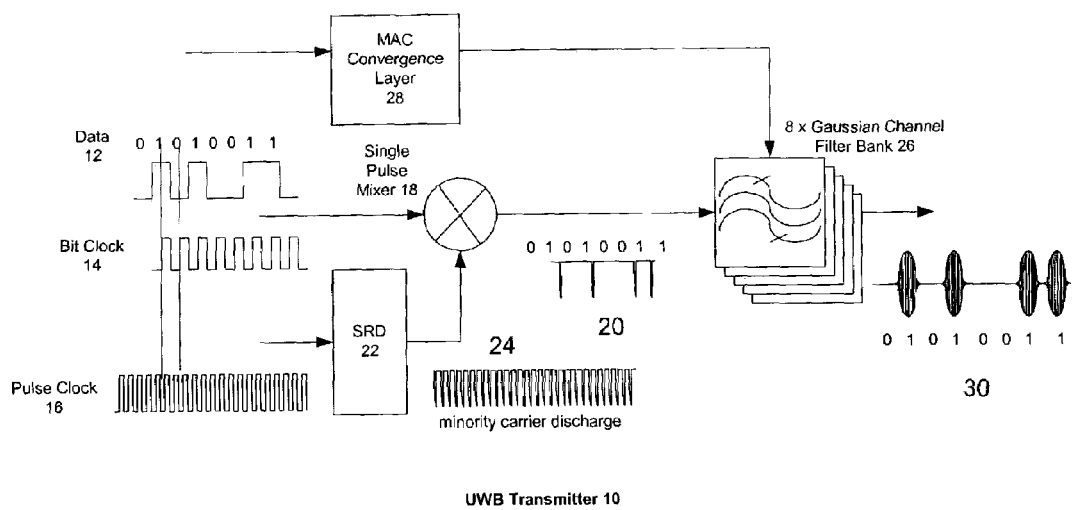
FIG. 2 shows a block diagram of an embodiment of a UWB transmitter configured in accordance with the present invention.

Referring now to FIG. 2, presently preferred means and methods of generating a transmit pulse train for a UWB transmitter 10 are illustrated. It should be recognized, however, that there are many other equivalent means and functions for the generation of these pulse trains. Transmitter 10 may be a stand-alone unit or it may be a transmit chain in a UWB transceiver. Shown in the illustration are the major blocks used to generate the pulse train as well as the form of the time domain pulse train at each stage.

The base band data 12 and bit clock 14, which may or may not be harmonically related to the pulse clock 16, are provided as inputs to a single pulse mixer 18. The mixer 18 produces a pulse train 20, in response to an input from SRD block 22. In this example, SRD block 22 is a step recovery diode (SRD) circuit. The SRD 22 provides means of generating very short pulses at harmonics of the pulse clock. In other embodiments equivalent means of generating a short time domain pulse, such as an avalanche mode transistor or matched impedance storage coaxial cables, may be used.

The SRD circuit 22 transforms the pulse clock train 16 into a sinusoidal signal and generates a single negative going pulse having a pulse width proportional to the minority carrier life time and transition time of the SRD per cycle of the sinusoid signal (see pulse train 24). As shown in pulse train 20, the single pulse mixer 18 produces one short RF pulse per data bit "1" at the time location of that data bit. The single short RF pulse representing a data bit "1" is then applied as an input to a selected one of the Gaussian filters from the filter bank 26. The particular Gaussian filter is selected by the media access controller (MAC) 28 for the transmit channel frequency of choice. The short RF pulse in pulse train 20 excites the impulse response of the channel filter, and produces a Gaussian shaped time domain pulse to be transmitted (see pulse train 30).

Thus, by using a suitably selected pulse clock rate, the data train 12 is converted into very short, RF time domain pulses (pulse train 20) to generate high intensity harmonic energy at higher channel frequencies. It is well known that the selection of the SRD 22 is dependent on the minority life-time of the diode to be much greater (>10) than the period of the sinusoidal signal generated by the pulse clock, and that the transition time of the SRD 22 is less than the period of the desirable output frequency to provide good multiplier characteristics. The output frequency is the channel filter frequency. The SRD 22 is driven into forward conduction on positive half cycle of the input signal, and the diode stores charge and appears as a low impedance. On the second half of the input signal cycle, the diode conducts until the stored charge is removed and switches off very rapidly at a speed governed by the transition time. The rapid switch-off action produces a very narrow energy pulse.

The input data stream 12 is gated by the single pulse mixer 18 using the bit-timing clock 14. The function of this mixer 18 is to allow one single short pulse generated by the SRD 22 to pass through for every bit of "1" in the data stream 12. In this way, the output pulse is in the same corresponding time location of the data "1" as in the data stream 12, in synchronization with the bit timing clock 14.

Figure 6:
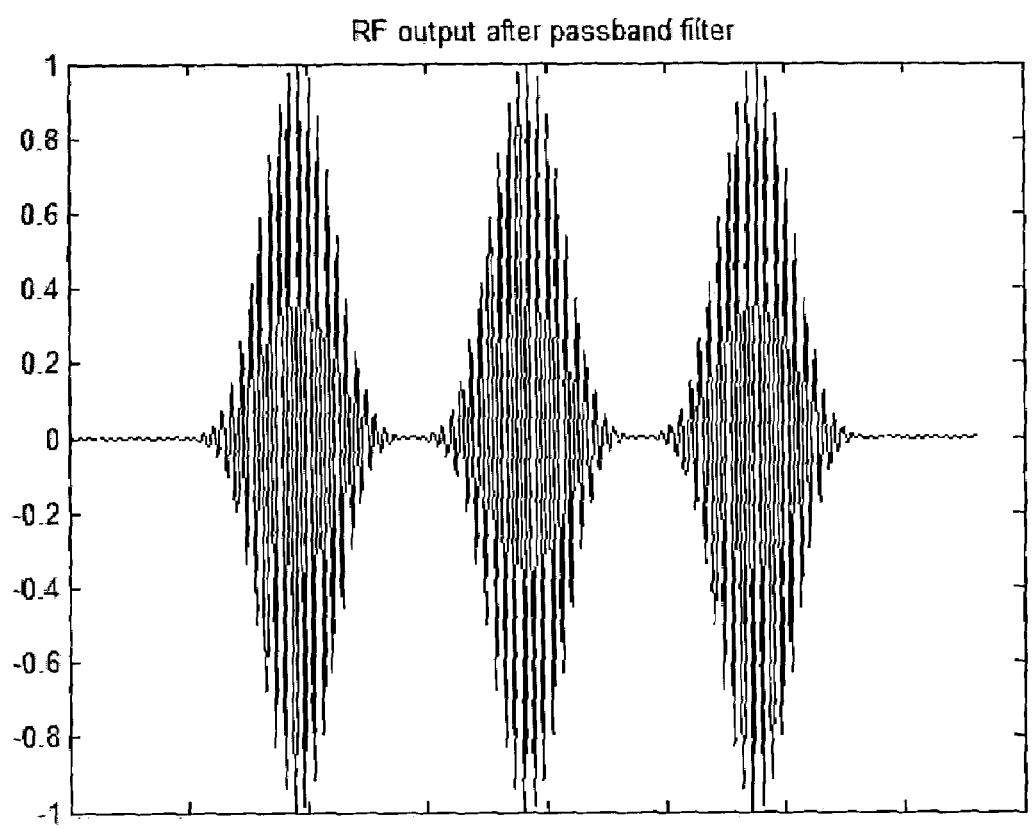
FIG. 6 shows an example of a wave shaped transmit pulse train for the data value of 01110.

It is well known in the communications art that a very narrow signal pulse input to a filter will excite the time impulse response of the filter. Thus, the pulse train 20 generated by the output of the single pulse mixer 18 into the selected Gaussian filter will excite a Gaussian shaped pulse train output 30. FIG. 6 shows the optimum spacing of a Gaussian wave shaped pulse train generated by the transmitter 10 for a data value 01110.

The transmit Gaussian filter is selected from a bank of Gaussian filters 26 covering the 3.1 to 10.6 GHz spectrum. The Gaussian filter bank 26 can be implemented as selectable (e.g., using a switch) respective LC elements (for the IC process), or distributed elements such as microstrip lines (for a discrete circuit board approach). Naturally, the filter bank 26 can also consist of a group of individual filters.

Figure 3:
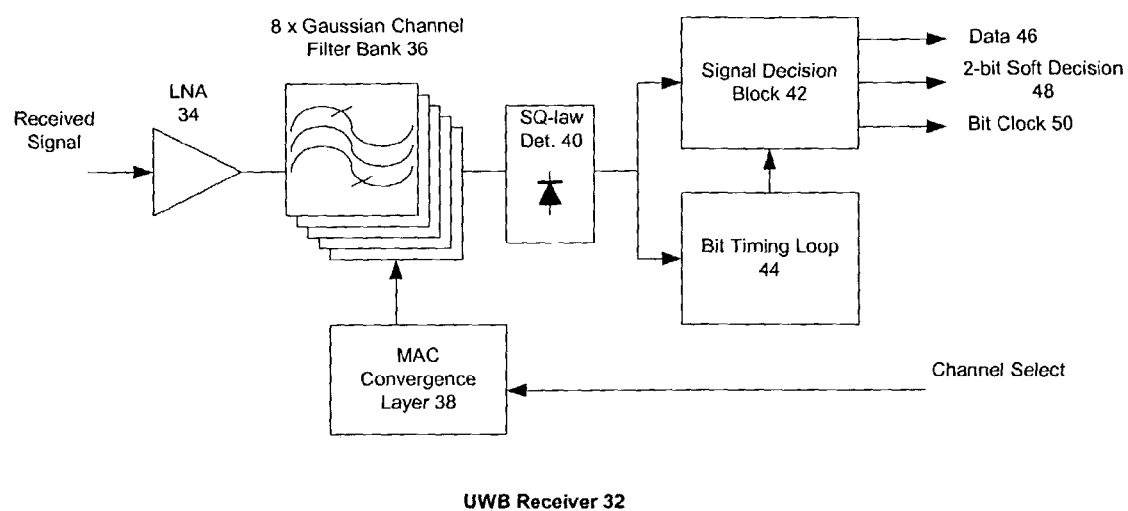
FIG. 3 shows a block diagram of an embodiment of a UWB receiver configured in accordance with the present invention.
Figure 7:
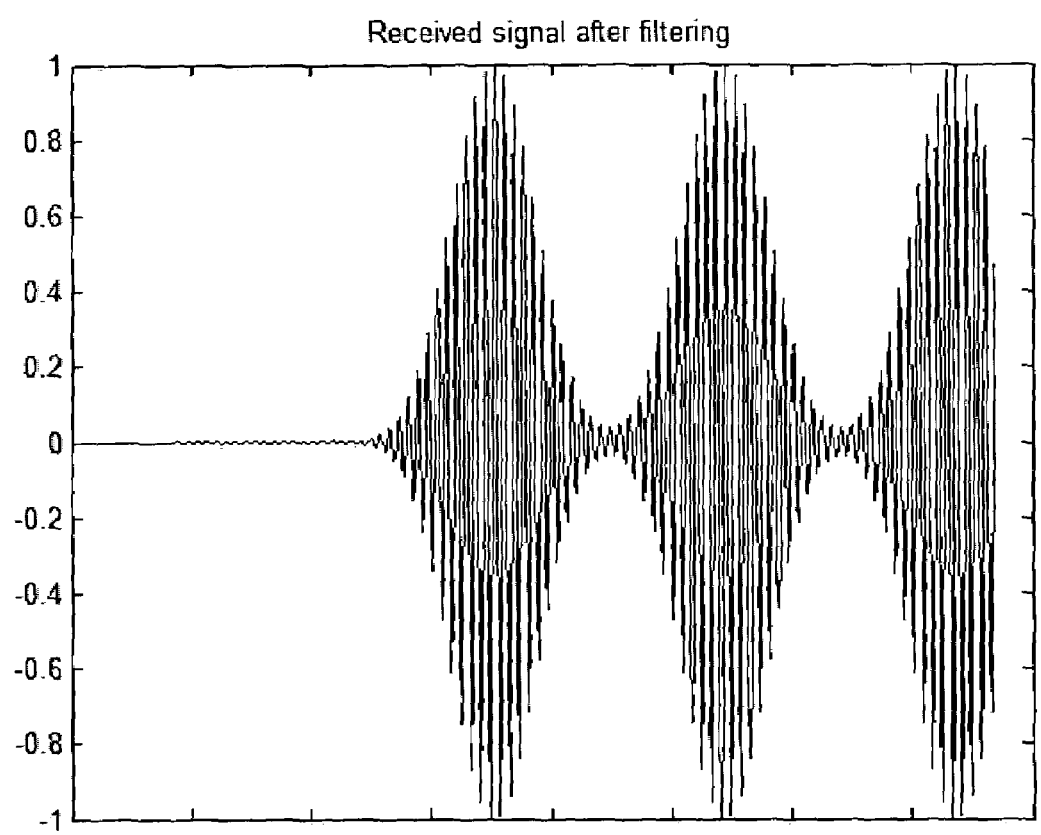
FIG. 7 shows an example of a received signal pulse train for the transmitted pulse shown in FIG. 6.

Referring now to FIG. 3, a UWB receiver 32 configured in accordance with an embodiment of the present invention is illustrated. In this receiver architecture (which may be implemented as a stand-alone device or as a receive chain in a transceiver), the received signal is first amplified by a low noise amplifier (LNA) 34. The purpose of the LNA 34 at the front end of receiver 32 is to amplify the received signal with very little added thermal noise. The amplified signal is then passed through a selected filter from the Gaussian filter bank 36 (which may be the same filter bank as used during transmission in a transceiver implementation) with appropriate filter selection being made by the MAC 38 through the user application. The receive filter should have the same center frequency as that of the corresponding transmit filter. High-speed modes are also accommodated via appropriate filter selection through MAC 38. FIG. 7 illustrates an example of the received version of the signal shown in FIG. 6, after being filtered by the receiver's Gaussian filters.

The signal output from the filter bank 36 is detected using a square law detector (e.g., a microwave detector diode) 40. The function of the detector 40 is to produce a corresponding voltage amplitude that is proportional to the received RF energy. This is similar to rectifying the RF signal to recover its voltage envelope. Thus, a received signal train is now present. The received signal is then processed by a signal decision block 42, and a bit timing loop block 44 to provide a data signal 46 as well as a two-bit soft decision signal 48, which provides a measure of confidence in the data signal as explained below. The bit clock 50 may also be recovered.

Figure 4:
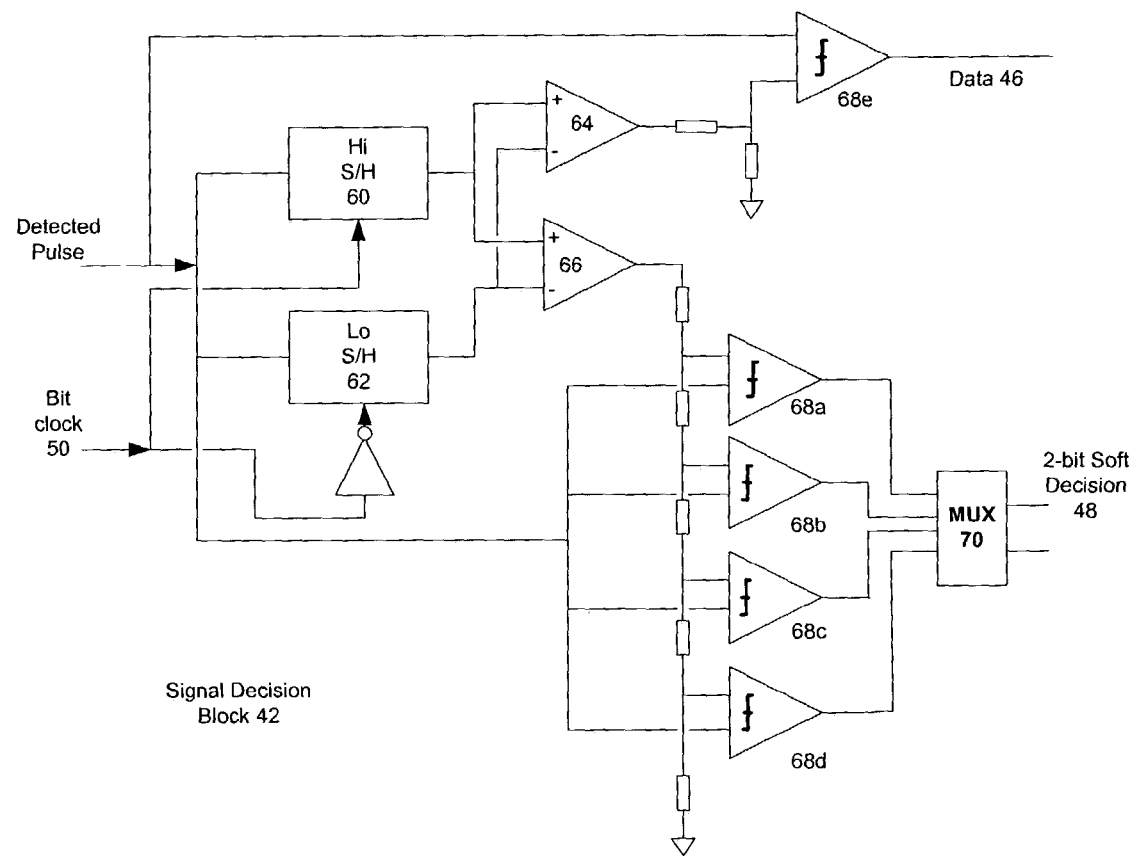
FIG. 4 is a block diagram of an embodiment of the signal decision block of FIG. 3.
Figure 5:
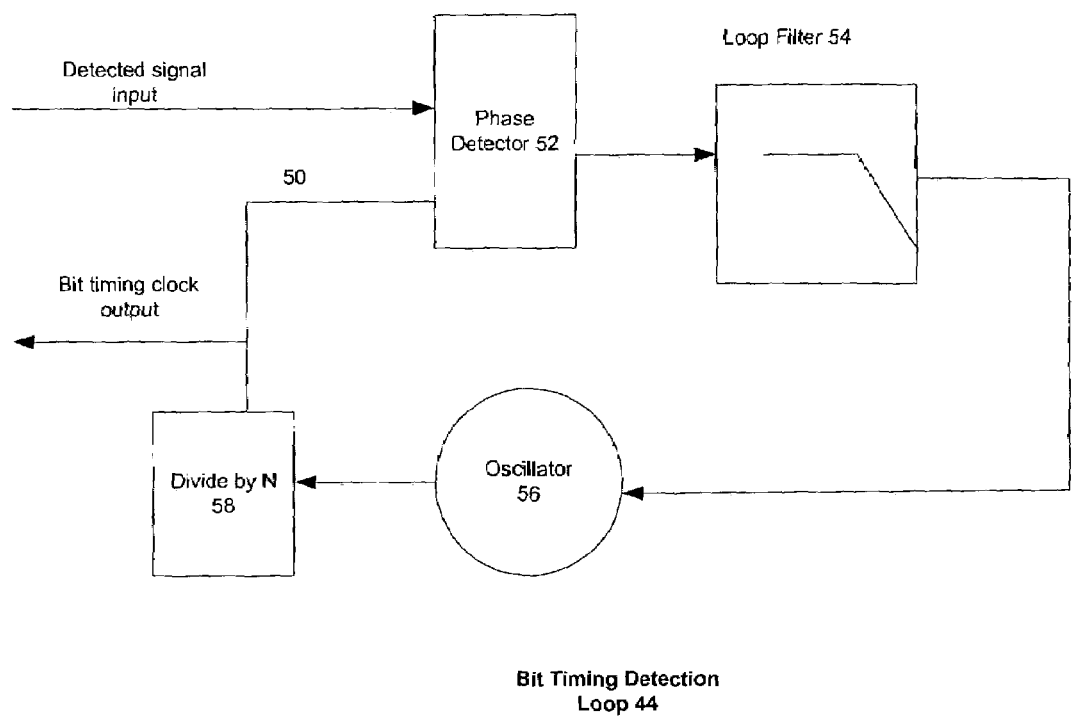
FIG. 5 is the block diagram of an embodiment of the bit timing loop of FIG. 3.

FIG. 4 shows a block diagram of one embodiment of signal decision block 42 in further detail, while FIG. 5 shows a block diagram of one embodiment of bit timing loop block 44 in greater detail. The design of a bit timing loop for a modem (of which receiver 32 is an example) is well known in the art and there are many ways of achieving bit timing synchronization. FIG. 5 shows a common phase lock loop implementation for such a synchronization circuit. Briefly, the detected signal from detector 40 is applied as one input to a phase detector 52. The other input to the phase detector is the bit timing clock 50. The output of the phase detector, which depends upon the phase difference between the two input signals, is filtered using a low pass filter 54 and the resulting filtered signal is used to drive a voltage controlled oscillator 56. The output of oscillator 56 is provided to a divide-by-N circuit 58, which provides as an output the bit timing clock 50.

Returning then to the signal decision block 42 illustrated in FIG. 4, it is understood that the transmitted signal pulses are formatted in signal packets in which a preamble sequence of pulses will be transmitted in such a manner that facilitates training of the receiver's signal decision block 42 and bit timing block 44. The purpose of the preamble pulses is to provide the signal decision block 42 with the relative amplitude of the detected pulses with respect to the noise floor of the receiver. The preamble pulses further allow the bit timing block 44 to achieve lock so that the actual bit timing of the transmission can be reproduced.

Within the signal decision block 42, the detected signal from the RF detector 40 is clocked (by the bit timing clock 50) into two sample and hold (S/H) circuits. The 'Hi' S/H circuit 60 is triggered by the presence of an RF pulse, and it samples and holds the value (i.e., the signal amplitude) of the detected RF pulse. On the other hand, the 'Lo' S/H circuit 62 is triggered by the absence of an RF pulse. It samples and holds the value of the RF signal in the absence of a pulse. This value will represent the noise floor of the receiver.

Two comparators 64 and 66, which are each coupled to receive the outputs of the S/H circuits 60 and 62, compare the different voltage or current values representing the presence or absence of the RF pulses. In essence, these comparators now have the differential value of the detected signal with respect to the noise floor of the receiving system. The sample and hold circuits 60 and 62 perform these measurements during the preamble period of the transmission and hold these values for later reference. That is, the reference values are provided to the receiver for the balance of a transmission in order to allow the receiver to differentiate between logic "1s" and "0s" in the received pulse train.

One of the comparators, designated 64 in the diagram, is used to make a so-called "hard decision" (the data output 46) as to whether or not there is a detected pulse present in the received pulse train. This is accomplished by comparing the amplitude of the received signal against the known amplitude of the detected pulses received during the preamble period of the transmission. A bias weighting circuit can be provided to increase the sensitivity of this detection. A decision is then made as to whether or not there truly is a pulse (i.e., a logic "1") present in the detected signal, and this decision is termed the data 'hard-decision'.

For example, any detected signal greater than the weighted value of one-half of the prior S/H value of the differential amplitude of the detected signal may be considered a positive detection of a pulse. Accordingly, a "Hi hard-decision" is made and output via integrator 68e. Weighted hard decision values can be set to a suitable level by virtue of the weight, so that a trade-off between signal detection sensitivity versus signal false alarms can be made. Using this system, the detection of the pulse will be possible at every bit timing clock tic in time. The hard decision circuit simply decides whether or not a pulse is present at that instant in time.

The second comparator, designated 66 in the illustration, provides a graduated level so that the approximated amplitude of the detected signal can be determined. As shown, for every detected signal there are two levels of "Hi" signal values and two "Lo" signal values. These values are called "soft-decisions" of the signal decision block 42. In essence, these "soft-decision" values indicate the confidence level in the detection of the signal.

For example, if a "Hi" signal is declared present in the received signal train by the hard-decision circuit, the soft-decision circuit provides a corresponding two-bit value indicating the confidence level in this decision. A soft decision value of 01 may indicate that the hard decision is likely to be in error. On the other hand, a soft decision value of 11 is a good indication that the hard decision is less likely to be in error.

The soft decisions are generated by a chain of integrators 68a-68d, each of which receive one input from the output of comparator 66 and another input from the received pulse train. The outputs of these integrators are provided as inputs to a 4:2 multiplexer 70, the output of which is the two-bit soft decision 48. This received data format (including hard-decision data 46 and its associated soft-decision value 48) allows for forward error correction (FEC) techniques to be applied to further strengthen the accuracy of the received data.

Thus, a UWB communication system has been described. It should be remembered, however, that although the present invention has been described with respect to various illustrated embodiments thereof, the broader scope of the invention should only be measured in terms of the following claims.

What is claimed is:

1. A communication system, comprising:
a transmitter configured to produce radio frequency (RF) pulses having a pulse duration in at least one channel of an RF spectrum approximately between 3.1 GHz and 10.6 GHz, the at least one channel having a bandwidth and being selected by a filter having an equivalent envelope function in both a time domain and a frequency domain, wherein the filter includes a Gaussian filter,
wherein the pulse duration of the RF pulses is harmonically related to the channel bandwidth, wherein the receiver is configured to receive RF transmissions in the RF spectrum according to a selected filter channel, and wherein the receiver is configured to provide a data output along with a confidence level output indicative of a likelihood of error in the data output.

2. The communication system of claim 1 wherein the filter is selected from a bank of filters having approximately equal bandwidths within the frequency spectrum.

3. The communication system of claim 1 wherein the transmitter comprises a single pulse mixer coupled to provide an output signal to the Gaussian filter, the single pulse mixer being configured to provide an RF pulse based on a data signal having a data bit rate determined by a pulse clock.

4. The communication system of claim 3 wherein the pulse clock is provided as an input to a step recovery diode circuit, the output of which is provided as an input to the single pulse mixer.

5. The communication system of claim 3 wherein the pulse clock has a period which is modulo(data bit rate).

6. The communication system of claim 5 wherein the channel bandwidth is modulo(data bit rate).

7. The communication system of claim 5 wherein the transmitter has a high speed mode in which a high speed mode transmission rate is odd modulo(data bit rate).

8. The communication system of claim 1 wherein the channel bandwidth comprises 800 MHz.

9. The communication system of claim 1 wherein the receiver shares the Gaussian filter with the transmitter.

10. The communication system of claim 1 wherein the data output and the confidence level output are provided through a pair of comparators which operate to measure received RF transmissions against established signal amplitude levels for logic 1s and logic 0s in a received pulse train.

11. The communication system of claim 10 wherein the receiver further comprises a pair of sample and hold circuits configured to store the established signal amplitude levels.

12. A receiver, comprising:
a channel filter bank configured to permit selection of one or more channel filters through which a received radio frequency (RF) signal is passed, wherein each filter of the channel filter bank includes a Gaussian filter;
a detector coupled to receive an output of the channel filter bank; and
a signal decision block configured to receive an output of the detector and to provide a data signal, wherein the channel filter bank cover a frequency spectrum between 3.1 GHz and 10.6 GHz, and each filter of the channel filter bank has an equivalent envelope function in both a time domain and a frequency domain, wherein the signal decision block is configured to provide the data signal along with a confidence level output indicative of a likelihood of error in the data signal.

13. The receiver of claim 12 wherein the data signal and the confidence level output are provided through a pair of comparators which operate to measure received RF transmissions against established signal amplitude levels for logic 1s and logic 0s in a received pulse train.

14. The receiver of claim 13 wherein the receiver further comprises a pair of sample and hold circuits configured to store the established signal amplitude levels.

* * * * *